United States Patent

[11] 3,621,950

| | | |
|---|---|---|
| [72] | Inventor | Dieter Lutz |
| | | Schweinfurt am Main, Germany |
| [21] | Appl. No. | 846,390 |
| [22] | Filed | July 31, 1969 |
| [45] | Patented | Nov. 23, 1971 |
| [73] | Assignee | Fichtel & Sachs AG |
| | | Schweinfurt am Main, Germany |
| [32] | Priority | Aug. 8, 1968 |
| [33] | | Germany |
| [31] | | P 17 75 415.3 |

[54] SHOCK ABSORBER INCLUDING VALVED BYPASS
9 Claims, 2 Drawing Figs.

[52] U.S. Cl............................................. 188/315,
188/318
[51] Int. Cl.............................................. F16f 9/34
[50] Field of Search................................ 188/100,
100 P, 88.51, 97, 97.1, 313, 314, 315, 318, 281

[56] References Cited
UNITED STATES PATENTS
656,232 8/1900 Westinghouse............. 188/97
3,419,114 12/1968 Rumsey....................... 188/97
FOREIGN PATENTS
754,288 8/1956 Great Britain................ 188/88 (.51)

*Primary Examiner*—George E. A. Halvosa
*Attorney*—Low and Berman

ABSTRACT: A hydropneumatic shock absorber of the piston-and-cylinder type is equipped with a compensating chamber enclosing a cushion of compressed gas and otherwise filled with liquid which also fills the cylinder. The flow section of a throttling conduit connecting the compensating chamber with the cylinder is controlled by a valve operated by a diaphragm which divides a control chamber into a first portion freely communicating with the compensating chamber and a second portion containing a gas under pressure and a helical compression spring. As the load on the shock absorber increases, the flow section of the throttling conduit is reduced.

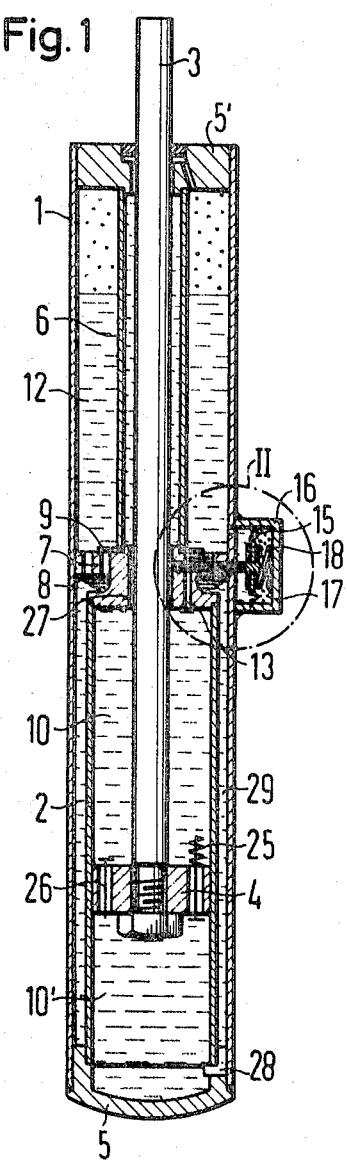
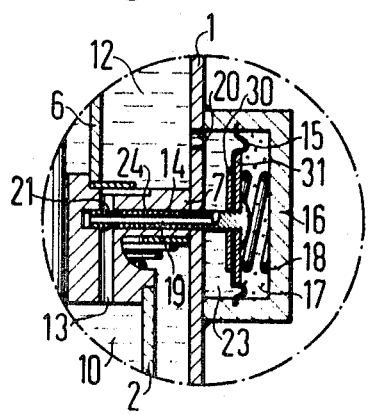

SHOCK ABSORBER INCLUDING VALVED BYPASS

This invention relates to shock absorbers, and particularly to shock absorbers of the piston-and-cylinder type as commonly employed in automotive vehicles and for similar applications.

It is known from the published German Pat. application No. 1,229,789 to equip such a shock absorber with a compensating chamber which communicates with the cylinder cavity through a throttling conduit. The flow section of the conduit is varied in response to the fluid pressure in the compensating compartment. The damping effect of the shock absorber is thereby adjusted to the applied load.

The known device relies for operativeness on close dimensional tolerances of its moving parts and is therefore relatively expensive to build and to maintain in good working order. If the required tolerances are not provided, the sensitivity of the device is impaired either by fluid leakage or by high friction losses.

The instant invention aims at providing a shock absorber of the basically known type which is very sensitive, yet can be assembled from parts whose dimensions need not be controlled with extreme precision, and is reliable in its operation.

With these objects in view, and others, as will hereinafter become apparent, the invention provides a valve arrangement for varying the flow section of the aforedescribed throttling passage whose control mechanism includes a control chamber divided into two portions by a diaphragm of flexible material. One of the control chamber portions communicates with the compensating chamber and is filled with fluid which also occupies the compensating chamber and the cylinder of the shock absorber. Pressure means are provided in the other portion of the control chamber for counteracting the pressure of the fluid on the diaphragm. A motion transmitting linkage connects the diaphragm with the valve in the throttling conduit.

Other features, additional objects, and many of the attendant advantages of this invention will readily become apparent as the same becomes better understood from the following description of a preferred embodiment when considered in connection with the appended drawing in which:

FIG. 1 shows a shock absorber of the invention in axially sectional elevation; and FIG. 2 is an enlarged view of a portion of the apparatus indicated in FIG. 1 by a chain-dotted circle.

Referring now to the drawing in detail, there is seen a shock absorber for a motor car without the conventional fittings which normally attach the same to the sprung and unsprung masses of a car. The outer shell 1 of the shock absorber is a cylindrical tube of slightly greater diameter than the wider portion 2 of a cylinder coaxially mounted in the shell. A piston rod 3 axially projects from the shell 1. Its inner end in the cylinder portion 2 carries an apertured piston 4. The interior of the shell 1 is axially sealed from the atmosphere by an imperforate bottom wall 5 and by an annular top wall 5′ in which the piston rod 3 is slidably received in sealing engagement.

A spacer tube 6 which constitutes the narrow portion of the shock absorber cylinder extends from the top wall 5′ to an annular plate 7 fixed in the shell 1 and upwardly bounding the cylinder portion 2. The spacer tube 6 and the shell 1 radially bound an annular compensating chamber 12 separated from an annular space 29 between the cylinder portion 2 and the shell 1 by a circumferential part of the plate 7, and connected with the space 29 by throttling passages in the plate 7, only partly illustrated. Annular valve flaps 8 close some of the passages when liquid flows upwardly through the plate 7, and similar flaps 9 close associated passages during downward liquid flow.

The piston 4 axially divides the cavity of the cylinder portion 2 into an upper compartment 10 and a lower compartment 10′ which communicate through axial throttling passages in the cylinder partly equipped with check valves 25, 26, as is known in itself. The cylinder compartment 10′ communicates with the annular space 29 through a passage 28 in the bottom wall 5. The piston rod 3 passes through an axial bore 27 in the plate 7 with sufficient clearance to provide a connection between the portions of the cylinder cavity above and below the plate 7.

As is better seen in FIG. 2, a throttling conduit 13 passes axially through the plate 7 from the cylinder compartment 10 into the compensating chamber 12. A radial guide bore or channel 24 extends partly through the plate 7 and through the shell 1 into a control chamber in a casing 16 sealed to the outer face of the shell 1 and intersects the conduit 13. A partly tubular, generally cylindrical valve member 14 is longitudinally slidable in the guide bore 24. A thin and flexible metal diaphragm 15 generally perpendicular to the axis of the valve member 14 divides the control chamber into two portions sealed from each other. The central portion of the diaphragm 15 carries stiffening washers 30, 31 on its opposite faces, and the enlarged head of the valve member 14 is fastened to the diaphragm by the washers.

The sealed space 17 in the casing 16 behind the membrane 15 contains fluid under pressure, as will be discussed in more detail hereinbelow, and a helical compression spring 18 which abuts against an inner wall of the chamber 16 and against the washer 31. The radial guide bore 24 of the plate 7 has a blind inner end which communicates through an axial bore 19 in the partly tubular valve member 14 with the space 23 in the casing 16 ahead of the washer 30 and the diaphragm 15. The space 23 is also connected with the compensating compartment 12 by a relatively wide opening 20 in the shell 1.

The valve member 14 has an annular, circumferential notch or groove 21 whose walls taper approximately conically toward the deepest portion of the groove. The effective flow section of the throttling conduit 13 is at its highest value when the groove 21 is fully aligned with the conduit, and decreases as the valve member 14 is moved away from the position of alignment by the flexing movement of the diaphragm 15 transmitted to the valve member by the washers 30, 31.

The top portion of the compensating chamber 12 adjacent the top wall 5′ holds a cushion of highly compressed gas. The remainder of the compensating chamber, the annular space 29, passage 28, cylinder compartments 10, 10′, spacer tube 6, throttling passage 13 and space 23 in the casing 16 are filled with a practically noncompressible liquid, as is conventional in hydropneumatic shock absorbers. The sealed space 17 behind the diaphragm 15 contains fluid which may be selected to provide desired operating characteristics. In the illustrated embodiment, compressed air in the space 17 tends to counteract the fluid pressure on the diaphragm 15 in the space 23.

In the illustrated condition of equilibrium, the combined pressure of the spring 18 and of the gas in the space 17 balances the liquid pressure in the space 23. The gas pressure thus is lower than the liquid pressure and the diaphragm assumes a precisely predictable and reproducible geometrical shape. If the position and shape of the necessarily flexible diaphragm were determined solely by the opposing fluid pressures, it could vary, and the response of the diaphragm to differences in fluid pressure in the spaces 17, 23 could change in an unpredictable manner. The spring 18 thus is helpful in providing uniform response of the shock absorber to changes in the load applied to the shell 1 and the piston rod 13 in the usual manner.

While the cylindrical guide channel or bore 24 intersects the cylindrical conduit 13, the axes of the two cylindrical passages are not located in a common plane, but are offset slightly at right angles to the plane of the drawing. The valve member 14 thus leaves a portion of the conduit 13 unobstructed in all its positions. The bore 19 in the valve member 14 almost instantaneously equalizes the pressures in the space 23 and in the blind end of the guide channel 24, thereby eliminating another source of inaccurate response of the shock absorber to load changes.

If the shock absorber operates under varying conditions of temperature, the nature of the material occupying the space 17 in the control chamber casing 16 has a significant effect on the operating characteristics of the shock absorber. If the shock absorber is desired to respond equally at all operating temperatures, the coefficient of expansion of the fluid in the space 17 should be substantially identical with the overall coefficient of thermal expansion of the fluid filling the remainder of the shock absorber. It is most convenient for this purpose to fill the space 17 with the same liquid and the same gas as the remainder of the shock absorber and in the same weight proportion.

If the viscosity of the liquid in the cylinder and the compensating chamber tends to decrease significantly with an increase in temperature, the resulting reduction in damping efficiency of the liquid can be balanced at least partly by filling the space 17 partly with paraffin oil or with a liquid having a coefficient of thermal expansion which is not significantly lower than the high coefficient of paraffin oil. As the temperature of the shock absorber increases, the expanding paraffin oil tends to reduce the available flow section of the conduit 13.

The axial length of a shock absorber can be increased at will in many automotive applications, but its diameter is limited. By axially offsetting the compensating chamber 12 from the main portion 2 of the cylinder, I can make the compensating chamber 12 of relatively great volume, more specifically, of relatively great cross-sectional area. The liquid level changes only slightly in the chamber 12 during operation of the shock absorber, and the moving liquid thus does not produce undesirable inertial thrust on the shock absorber.

The operation of the illustrated shock absorber will be obvious from the structure described.

When the piston rod 3 moves inward of the shell 1 an the cylinder, liquid flows upwardly through the piston 4 from the compartment 10' into the compartment 10 as the check valve 26 is opened. Liquid is also displaced from the compartment 10' through the passage 28 and the annular space 29 into the compensating chamber 12 to compress the gas cushion therein.

Upon rebound of the piston rod 3, liquid flows through the piston 4 past the valve 25 into the compartment 10', from the compensating chamber 12 through the valve 8, the annular space 29 and the passage 28 into the compartment 10'. The amount of liquid displaced from the cylinder portion 2 into the compensating chamber 12 during inward movement of the piston rod 3 is related to the applied load, and the average pressure in the chamber 12 thus increases with the load. Liquid therefore also flows through the conduit 13 in the plate 7, and the damping characteristics of the shock absorber are significantly affected by the flow resistance of the conduit 13. As the load on the shock absorber and the pressure in the chamber 12 increase, the flow section of the conduit 13 is decreased, and the response to the shock absorber to additional loading is decreased by the enchanced throttling effect of the partly obstructed conduit 13. With decreasing load and decreasing pressure in the compensating chamber, the membrane 15 tends to shift the valve member 14 toward a position of alignment of the notch or groove 21 with the conduit 13 to increase the effective flow section of the latter.

The internal moving elements of the illustrated shock absorber need not be finished to exacting tolerances. The valve member 14 may permit fluid to leak through the bore 24. As mentioned above, no seal is needed between the piston rod 3 and the plate 7.

The fittings which normally fasten the shell 1 and rod 3 to a wheel and the frame of an automotive vehicle have been omitted from the drawing since they are conventional in themselves. The illustrated shock absorber has been used to advantage in cooperation with a helical compression spring coiled about the shell 1 and having ends respectively fastened to the shell and to the piston rod 3 in an independent suspension arrangement for a steered front wheel of a motor car whose axle may be directly attached to the shell 1 (McPherson-type suspension).

What is claimed is:

1. A shock absorber comprising, in combination:

a. a cylinder member having an axis and defining a cavity therein, said cylinder member having an end wall axially bounding said cavity;
b. a piston rod member sealingly received in said end wall for axial movement and having respective terminal portions in said cavity and outside said cylinder member;
c. a piston slidably received in said cavity and fastened to one of said terminal portions, said piston axially dividing said cavity into two compartments and being formed with a throttling passage connecting said compartments;
d. a tubular shell substantially coaxial with said cylinder member,
 1. said shell and said cylinder member radially bounding a compensating chamber therebetween;
e. an annular plate member interposed between said cylinder member and said shell member and axially bounding said chamber,
 1. said plate member being formed with a throttling conduit connecting said chamber with said cavity,
 2. said conduit having a flow section substantially smaller than the respective flow sections of adjacent portions of said cavity and of said chamber;
f. fluid under a pressure higher than atmospheric pressure filling said cavity, said chamber, and said conduit;
g. valve means for varying the flow section of said conduit; and
h. valve control means responsive to the pressure of said fluid in said chamber for operating said valve means, said valve control means including
 1. a control chamber,
 2. a flexible diaphragm dividing said control chamber into two portions, one of said portions communicating with said compensating chamber and being filled with said fluid, the other one of said portions being sealed,
 3. pressure means in said other portion for counteracting the pressure of said fluid on said diaphragm in said one portion, and
 4. motion transmitting means connecting said diaphragm with said valve means.

2. A shock absorber as set forth in claim 1, wherein said pressure means include fluid under pressure substantially filling said other portion and a spring interposed between a wall of said control chamber and said diaphragm.

3. A shock absorber as set forth in claim 1, wherein said conduit is formed with a guide opening, and said valve means include a valve member movably received in said opening and connected to said diaphragm by said motion transmitting means.

4. A shock absorber as set forth in claim 1, further comprising guide means defining an elongated guide channel intersecting said throttling conduit, said value means including an elongated, tubular valve member slidably received in said guide channel and of varying external cross section, one end of said guide channel being sealed and the bore of said tubular valve member being open to the sealed end of said guide channel, the other end of said valve member being fastened to said diaphragm by said motion transmitting means, and said bore communicating with said one portion of said control chamber.

5. A shock absorber as set forth in claim 1, wherein said pressure means include a fluid medium having a coefficient of thermal expansion substantially identical with the coefficient of expansion of said fluid under pressure.

6. A shock absorber as set forth in claim 1, wherein said pressure means include a gas under pressure and a body having a coefficient of thermal expansion not substantially smaller than that of paraffin oil.

7. A shock absorber as set forth in claim 1, a portion of said conduit extending in the direction of the common axis of said cylinder and of said shell, said plate member being formed with an elongated bore intersecting said conduit, and said valve means including an elongated valve member received in said bore for longitudinal movement and formed with a notch in an outer surface thereof, said motion transmitting means connecting said valve member to said diaphragm for movement of the valve member toward and away from a position in which said notch is located in said conduit, when said diaphragm is flexed.

8. A shock absorber as set forth in claim 1, wherein said cylinder member has two portions of different cross section extending in opposite axial directions from said plate member, said piston being located in the portion of said cylinder member of greater cross section, and said piston rod member extending through the portion of said cylinder member of smaller cross section.

9. A shock absorber as set forth in claim 8, wherein said compensating chamber is axially coextensive with said portion of smaller cross section, said shell and said portion of greater cross section defining an annular space communicating with the axially terminal part of said portion of greater cross section remote from said plate member, the plate member being formed with a throttling passage connecting said annular space and said compensating chamber.

* * * * *